Figure 1:
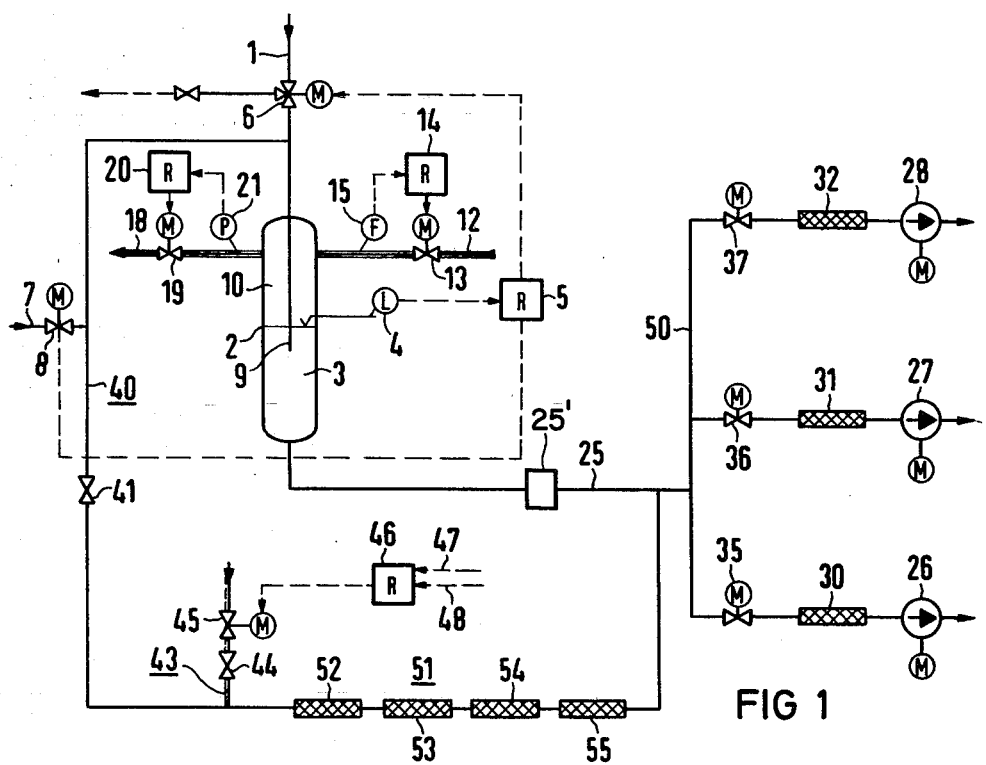

United States Patent [19]

Deinlein et al.

[11] 4,374,083
[45] Feb. 15, 1983

[54] NUCLEAR REACTOR HAVING A LIQUID COOLANT

[75] Inventors: Hans Deinlein, Nuremberg; Gottfried Kummer, Marloffstein, both of Fed. Rep. of Germany

[73] Assignee: Kraftwerk Union Aktiengesellschaft, Mulheim an der Ruhr, Fed. Rep. of Germany

[21] Appl. No.: 52,256

[22] Filed: Jun. 26, 1979

[30] Foreign Application Priority Data

Jun. 27, 1978 [DE] Fed. Rep. of Germany ....... 2828153

[51] Int. Cl.³ .............................................. G21C 7/00
[52] U.S. Cl. ..................................... 376/306; 376/314
[58] Field of Search .............. 176/37, 38, 92 R, 92 A, 176/92 B, 65; 261/36 R, DIG. 27, DIG. 72; 55/523; 376/306, 314

[56] References Cited

U.S. PATENT DOCUMENTS

| 2,937,981 | 5/1960 | Allen | 176/38 |
|---|---|---|---|
| 3,041,134 | 6/1962 | Weeks | 176/37 |
| 3,077,445 | 2/1963 | Frederick | 176/37 |
| 3,660,229 | 5/1972 | Klingbeil | 176/65 |
| 3,796,657 | 3/1974 | Pretorius | 261/DIG. 72 |
| 3,930,817 | 1/1976 | Stevenson | 55/523 |
| 4,010,068 | 3/1977 | Cooper | 176/37 |
| 4,024,911 | 5/1977 | Forrest | 176/37 |
| 4,043,865 | 8/1977 | Kausz | 176/37 |
| 4,075,060 | 2/1978 | Colburn | 176/37 |
| 4,096,215 | 6/1978 | Albrecht | 261/DIG. 27 |
| 4,157,939 | 6/1979 | Schabert | 176/38 |
| 4,183,369 | 1/1980 | Thomas | 55/523 |

OTHER PUBLICATIONS

W. Davis, *The BR-3 Reactor*, The Westinghouse Engineer (Nov. 1960), pp. 162–165.

*Primary Examiner*—Sal Cangialosi
*Attorney, Agent, or Firm*—Herbert L. Lerner

[57] ABSTRACT

Nuclear reactor with a liquid coolant loop having a volume control surge tank for the coolant disposed in the loop, and a high pressure pump disposed in the loop for feeding coolant taken from the loop back into the loop after purification. A line bypassing the volume control surge tank and having an end connected to the suction side of the high-pressure pump, and a feed-in for introducing hydrogen into a liquid-filled section of the loop on the suction side of the high-pressure pump.

9 Claims, 4 Drawing Figures

NUCLEAR REACTOR HAVING A LIQUID COOLANT

The invention relates to a nuclear reactor with a liquid coolant, especially water, in a cooling loop to which hydrogen is added, and having a volume control surge tank for the coolant and a high-pressure pump which feeds coolant taken from the cooling loop back into the cooling loop after purification.

In the book "VGB-Kernkradtwerks-Seminar 1970", especially on page 41 thereof, a volume control system for a pressurized-water reactor is described that is used, among other things, for feeding-in chemicals. Part of this system, through which a portion of the reactor cooling water continuously flows, is also charged with hydrogen. This is to counteract the radiolytic decomposition of the coolant in the vicinity of the core.

In the known system, the hydrogen is added into the volume control surge tank, which is part of the volume control system, and is therefore present above the liquid level as a gas cushion. The partial $H_2$ pressure in the gas cushion is set in accordance with the desired hydrogen concentration in the cooling water.

As the hereinafore-mentioned reference literature shows, the volume control system contains high-pressure pumps because the cooling system must be fed back into the primary loop of the pressurized-water reactor in which, as is well-known, pressures of, for instance, 160 bar prevail.

It is accordingly an object of the invention to provide a nuclear reactor having a liquid coolant which overcomes the hereinafore-mentioned disadvantages of the heretofore known devices of this general type, and to modify the known volume control system with the objective of reducing the hydrogen components present in the volume control surge tank outside the volume of liquid, so that the danger of oxyhydrogen gas explosions if leaks occur is completely eliminated.

With the foregoing and other objects in view, there is provided, in accordance with the invention, a nuclear reactor with a liquid (especially water) coolant loop having a volume control surge tank for the coolant disposed in the loop, and a high pressure pump disposed in the loop for feeding coolant taken from the loop back into the loop after purification, comprising a line bypassing the volume control surge tank and having an end connected to the suction side of the high-pressure pump, and means for introducing hydrogen into a liquid-filled section of the loop on the suction side of the high-pressure pump.

With the use of the invention, the hydrogen to be added is directly fed into the liquid. Thus, it is no longer necessary to place very stringent requirements on the tightness of the volume control surge tank, since a flammable mixture can no longer be produced in the event of leaks.

In accordance with another feature of the invention, the hydrogen introducing means feeds hydrogen gas to the bypass line.

In accordance with a further feature of the invention, the hydrogen introducing means mixes hydrogen gas with coolant bled off from the volume control surge tank.

In accordance with an additional feature of the invention, there are provided means for mixing hydrogen and coolant, disposed up-stream of the hydrogen introducing means, in flow direction of the coolant. The mixing means or section is a section of line with built-in components which causes deflection of the liquid flowing through it and thereby effects thorough mixing of added gas components.

In accordance with an added feature of the invention, there is provided a gas separator disposed upstream of the mixing means, in the flow direction of the coolant. This prevents the occurrence of large gas bubbles due to excess hydrogen on the suction side of the high-pressure pump.

In accordance with still another feature of the invention, there is provided a hydrogen delivery source connected to the hydrogen introducing means, and means connected to the gas separator and the hydrogen introducing means, for controlling the delivery rate from the hydrogen delivery source. The hydrogen source can be commercially available gas bottles with a suitable regulating device which is, for instance, a reducing valve.

In accordance with still a further feature of the invention, there is provided a gas outlet line connected from the gas separator to the hydrogen introducing means, and a compressor preferably a diaphragm compressor, disposed in the gas outlet line. In this way, the hydrogen collected in the gas separator is again transported back into the liquid-filled line section with the feeding point or hydrogen introducing means. Further addition of hydrogen can then be dispensed with until the control device connected to the gas separator determines a demand for hydrogen to be added. It is assumed here that the gas which is separated in the gas separator behind the hydrogen feed-in point is substantially all hydrogen.

The hydrogen content can be determined with measuring devices such as a process chromatograph. Other gas analyzers can also be used; the hydrogen content need not necessarily be determined continuously but can be performed at certain time intervals.

In accordance with still an additional feature of the invention, the hydrogen introducing means includes a ceramic filter cartridge. Thereby, a fine distribution is achieved, which promotes the dissolution of the hydrogen in the coolant.

In accordance with a concomitant feature of the invention, there is provided an exhaust gas system connected to the volume control surge tank above the coolant level. The gas space of the volume control surge tank, which in the invention is no longer required for hydrogen enrichment, should be connected to the exhaust gas system in such a manner that, contrary to known practice, the hydrogen content in the gas space remains reliably below 4%. Since the danger of oxyhydrogen gas explosions exists only above 4%, the connection to the exhaust gas system is used here to keep the amount of hydrogen small, while in the known system, a pure hydrogen cushion is present for the purpose of charging with gas.

Other features which are considered as characteristic for the invention are set forth in the appended claims.

Although the invention is illustrated and described herein as embodied in nuclear reactor having a liquid coolant, it is nevertheless not intended to be limited to the details shown, since various modifications and structural changes may be made therein without departing from the spirit of the invention and within the scope and range of equivalents of the claims.

Figure 2:
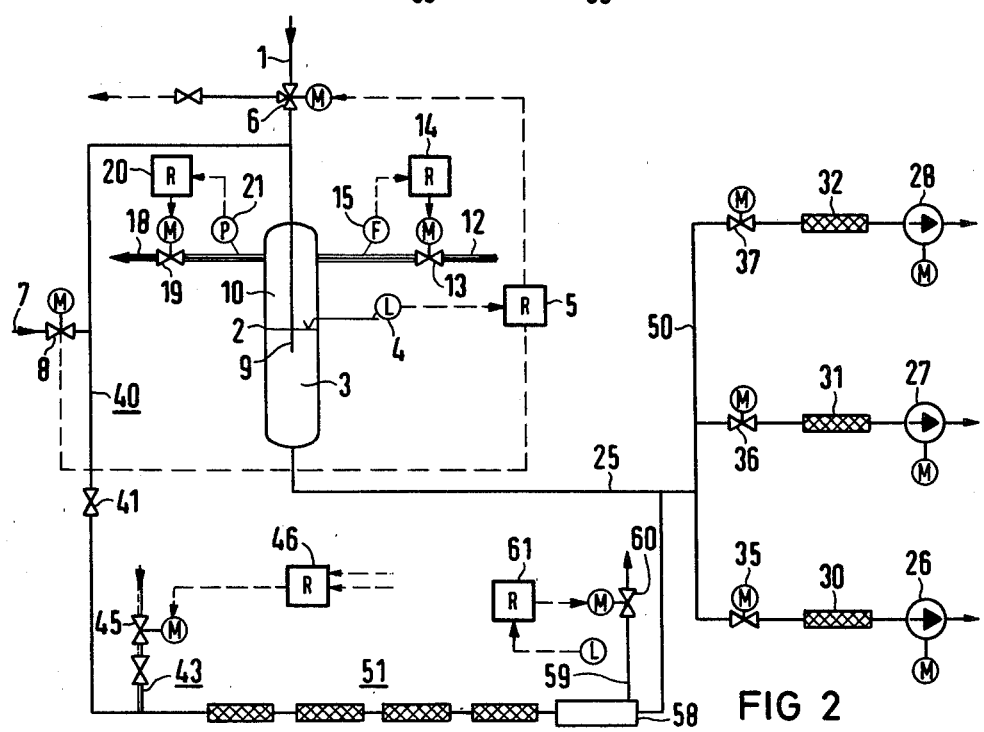
Figure 3:
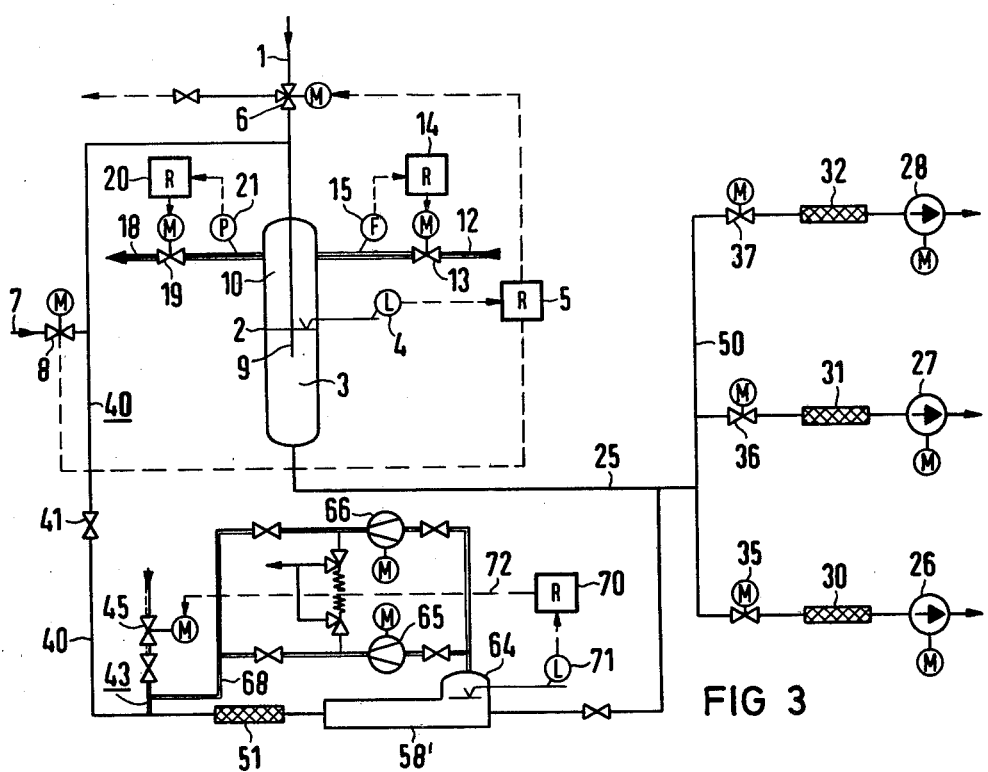
Figure 4:
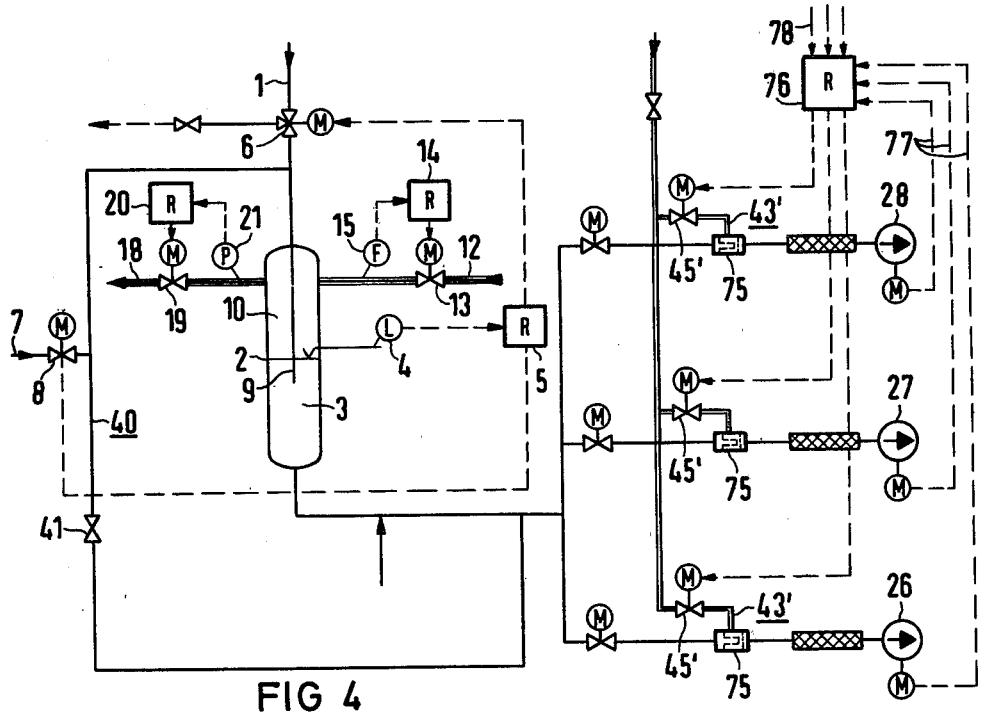

The construction and method of operation of the invention, however, together with additional objects and advantages thereof will be best understood from the following description of specific embodiments when read in connection with the accompanying drawings, in which:

FIG. 1 is a diagrammatic view of a part of a piping diagram of the volume control system of a pressurized-water reactor, in accordance with one embodiment of the invention; and FIGS. 2 to 4 are views similar to FIG. 1 of a second, third and fourth embodiment of the invention.

Referring now to the figures of the drawing, and first, particularly to FIG. 1 thereof, there is seen a line 1 which comes from the non-illustrated primary loop of a pressurized water reactor, and leads to a volume control surge tank 2. The lower part 3 of the volume control surge tank is filled with cooling water. The liquid level is measured with a measuring device 4 which acts on a control 5. The latter controls a delivery valve 6 in the line 1 and the make-up or refill through a line 7 with a valve 8. The end 9 of the line 1 is below the liquid level.

In the volume control surge tank 2, the gas space 10 above the volume of liquid is inserted into an exhaust gas system, not shown in detail. To this end, a line 12 leads from the exhaust gas system to the volume control surge tank 2 past a valve 13. The opening of the valve 13 is controlled by a control device in dependence on a measuring point 15, for instance, for constant throughput.

Another line branch 18, which also has a control valve 19, leads from the gas space 10 to the exhaust gas system. Its control device 20, however, is set for constant pressure by a measuring point 21. The gas space 10 is thereby flushed continuously and is simultaneously brought to a definite pressure of, for instance, 3 bar. The pressure should be above the partial hydrogen pressure for the desired hydrogen content.

The volume control surge tank 2 is connected through a suction line 25 to three high-pressure pumps 26, 27 and 28. These high-pressure pumps are connected in parallel through mixing sections 30, 31 and 32, and valves 35, 36 and 37, in series therewith. They transport the cooling water back into the primary cooling loop, from which the line 1 branches off.

A bypass line 40 which leads from the line 1 to the liquid-filled suction line or loop section 25 and can be shut off by a hand-operated valve 41 is connected parallel to the volume control surge tank. At the bypass line 40, a feed-in point for hydrogen ($H_2$) is provided. The feed-in point comprises a check valve 44 and a control valve 45. The control valve 45 is controlled by a control device 46. The values of the hydrogen content in the cooling water and the known operating state of the degassification system, are fed to the control device 46 in a manner which is therefore not specifically shown. The measuring lines therefor are indicated at 47 and 48.

Between the feed-in point or hydrogen introducing means 43 to the liquid-filled loop section and a connecting line 50 of the suction line 25 itself to the three high-pressure pumps 26, 27 and 28, a mixing section 51 is disposed. The mixing section 51 comprises, for instance, four individual members 52, 53, 54 and 55. By means of the mixing section 51, the fed-in hydrogen is thoroughly mixed with the cooling water, so that the hydrogen is dissolved in the water as completely as possible.

In the embodiment example according to FIG. 2, the mixing section 51 is followed by a gas separator 58, the gas exhaust 59 of the separator 58 is connected through a control valve 60 to an exhaust gas system. In this manner, it is assured that no free hydrogen is present after or downstream of the mixing section 51, which might lead to gas bubbles or to cavitation in the area of the high-pressure pumps 26, 27 and 28. The control valve 60 can be opened by a control system 61 if gas appears in the gas separator 58. The control 46, on the other hand, feeds-in hydrogen from a central source to between 2 ppm and 4 ppm hydrogen content in the coolant; the throughput is taken into consideration in the delivery of the pumps 26 to 28.

The pressure in the volume control surge tank 2 is set for a partial hydrogen pressure of 4 ppm. Thus, it is impossible for the hydrogen content behind or upstream of the separator 58 to exceed 4 ppm and therefore no strict requirements need to be met as to monitoring the hydrogen concentration. For this reason, intermittent monitoring may be entirely sufficient.

In the embodiment example according to FIG. 3, the feed-in point 43 is followed by a gas separator 58' having a dome 64. Two diaphragm compresors 65 and 66 are connected in parallel to the dome 64. The diaphragm compressors 65 and 66 pump through a line 68 into the feed-in point 43. Therefore, excess hydrogen accumulated in the gas separator 58' is returned into the line 40. Simultaneously, the gas content in the separator 58' is determined by a control device 70 through a measuring device 71. In this way, the control valve 45 is actuated, as indicated by the dotted line 72, representing a functional connection. The feeding of hydrogen at the valve 45 from a non-illustrated hydrogen source is thus made directly dependent on the hydrogen content in the coolant, which is determined after the mixing section 51.

In the embodiment example according to FIG. 4, the feed-in point 43' is associated with the suction lines of the pumps 26, 27 and 28 in parallel. The feed-in point ends in ceramic filter cartridges 75 and comprises control valves 45' which are connected to a control device 76. The control device 76 takes into consideration, as reference inputs, the operation of each of the active pumps 26 to 28, as is indicated by the dotted functional connection lines 77. In addition, the hydrogen content which is present after or downstream of the pumps and is being determined continuously, is processed in the control device 76, as indicated by the dotted functional connection lines 78.

The control devices 46, 76 may be gas analyzers. Suitable apparatus and installation instructions therefor may be found in the August 1974 issue of Siemens-Betriebsanleitung (Siemens Instruction Book) MP 1.3 A 38/1 D.

There are claimed:

1. In a nuclear reactor with a primary loop and a liquid coolant loop connected to the primary loop, having a volume control surge tank for the coolant disposed in the liquid coolant loop, and a high pressure pump having a suction side and being disposed in the liquid coolant loop for feeding coolant taken from the primary loop back into the primary loop after purification, the improvement comprising a line bypassing the volume control surge tank and having an end connected to the suction side of the high-pressure pump, and means for introducing hydrogen gas into a liquid-filled section of the liquid coolant loop between the volume control surge tank and the suction side of the high-pressure pump.

2. Nuclear reactor according to claim 1, wherein said hydrogen introducing means feed hydrogen gas to said bypass line.

3. Nuclear reactor according to claim 1, wherein said hydrogen introducing means mixes hydrogen gas with coolant bled off from the volume control surge tank.

4. Nuclear reactor according to claim 1, including means for mixing hydrogen and coolant, disposed downstream of said hydrogen introducing means.

5. Nuclear reactor according to claim 4, including a gas separator disposed downstream of said mixing means.

6. Nuclear reactor according to claim 5, including a hydrogen delivery source connected to said hydrogen introducing means, and means connected to said gas separator and said hydrogen introducing means, for controlling the delivery rate from said hydrogen delivery source.

7. Nuclear reactor according to claim 5 or 6, including a gas outlet line connected from said gas separator to said hydrogen introducing means, and a compressor disposed in said gas outlet line.

8. Nuclear reactor according to claim 1, wherein said hydrogen introducing means includes a ceramic filter cartridge.

9. Nuclear reactor according to claim 1, including an exhaust gas system connected to the volume control surge tank above the coolant level.

* * * * *